United States Patent [19]

Page

[11] 3,999,232
[45] Dec. 28, 1976

[54] DIETARY CONTROL GREASE MOP

[75] Inventor: Richard M. Page, New Orleans, La.

[73] Assignee: Pro Diet Mop, Inc., Belle Chasse, La.

[22] Filed: June 20, 1975

[21] Appl. No.: 588,860

[52] U.S. Cl. .............................. 15/229 R; 15/169
[51] Int. Cl.² ........................................ A47L 13/20
[58] Field of Search ............ 15/169, 229 R, 229 A, 15/229 AC, 229 AP, 229 AW, 229 B, 225, 228, 229 BP, 147 R; 210/DIG. 21

[56] References Cited

UNITED STATES PATENTS

| | | | |
|---|---|---|---|
| 2,290,534 | 7/1942 | Cave | 15/169 X |
| 3,748,682 | 7/1973 | Rhodes | 15/229 R |
| 3,881,211 | 5/1975 | Rhodes | 15/225 |

Primary Examiner—Edward L. Roberts
Attorney, Agent, or Firm—Wilkinson, Mawhinney & Theibault

[57] ABSTRACT

The present disclosure is directed to a dietary control grease mop for removing cooking grease and oils from food during cooking which employs a group of thin gauge narrow strips of polypropylene grasped at their mid-point by a wire loop the remainder of the wire being twisted to define a threaded shaft over which a tubular casing is passed and an open ended cup is slidably carried to cause flaring or fanning out of the polypropylene strips. The free end of the threaded shaft is screwed into a handle which also receives the tubular casing. The open ended cup being slidable toward the handle to facilitate cleaning of the narrow strips of polypropylene.

1 Claim, 3 Drawing Figures

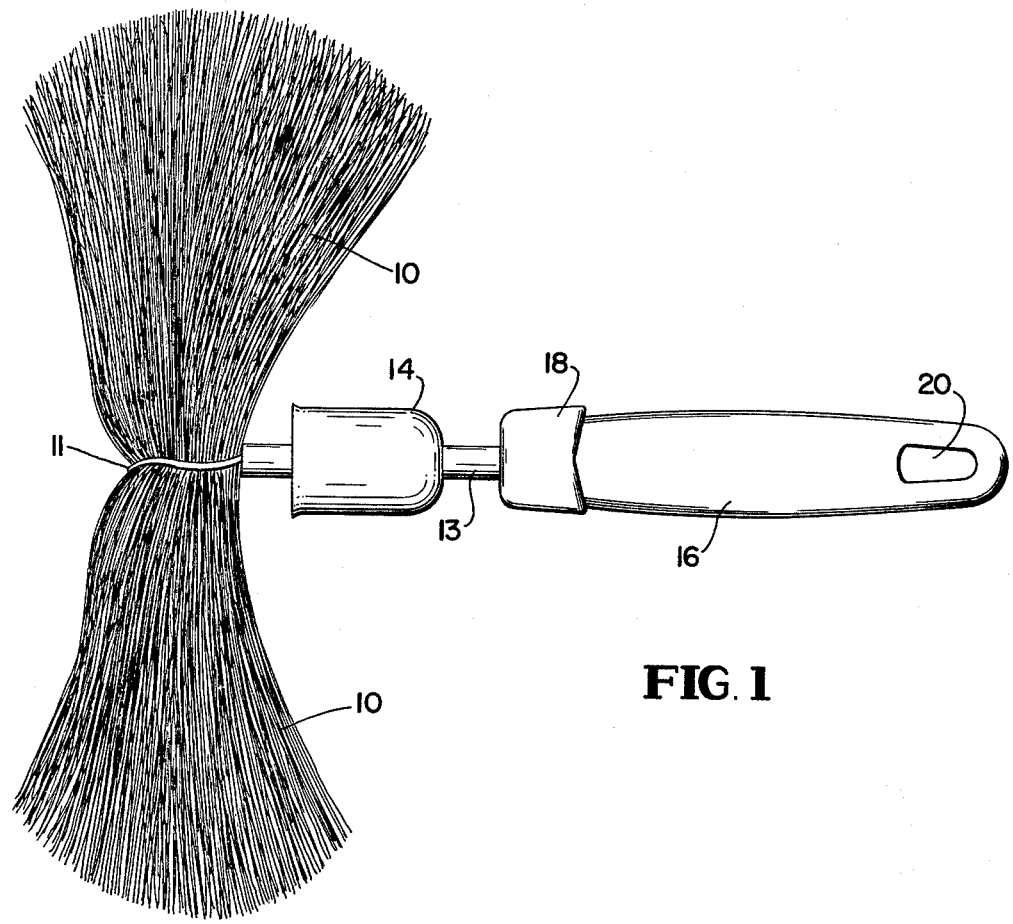
FIG. 1
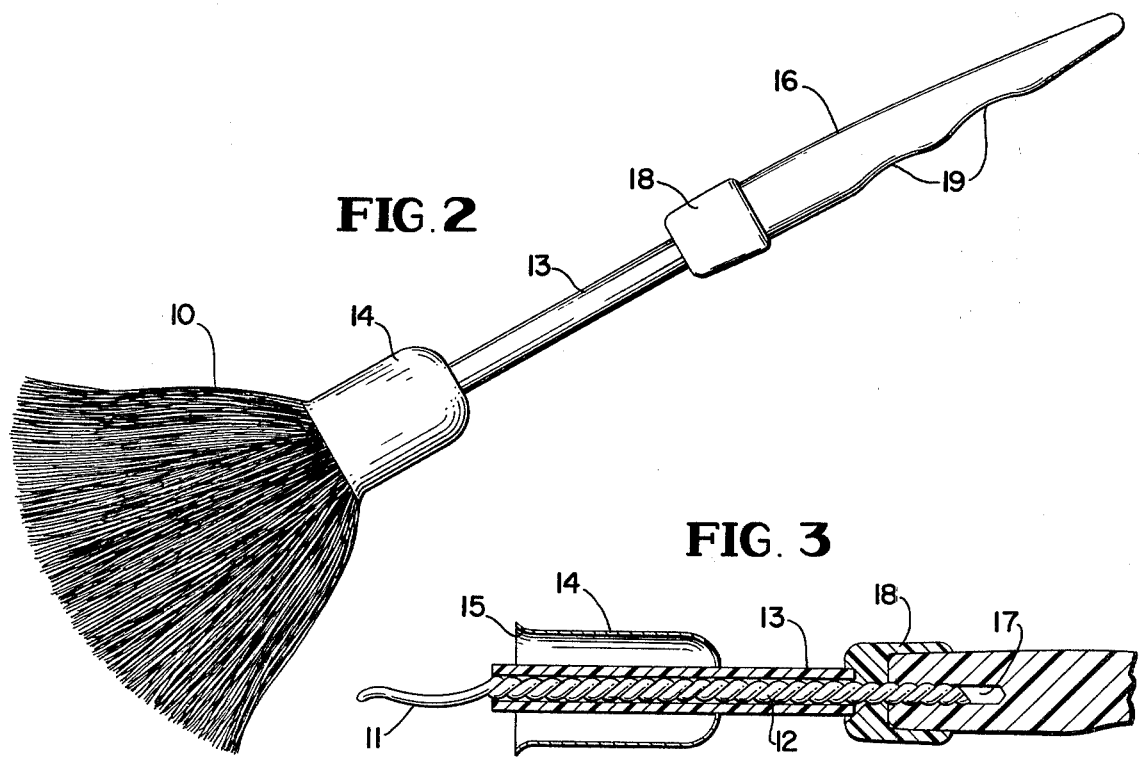
FIG. 2
FIG. 3

DIETARY CONTROL GREASE MOP

An object of the present invention is to provide a dietary control oil or grease mop to remove surface oil floating on top of food being cooked such as chile and some soups which employs thin gauge strips of polypropylene which absorb oil leaving the water behind.

A further object of the present invention is to provide an oil or grease mop of thin gauge narrow strips of polypropylene which can be quickly assembled and a handle applied thereto with a slide cup to cause the strips to be flared or fanned out for washing and reusing of the mop.

THE PRIOR ART

The best prior art known by applicant at this time are the two Rhodes U.S. Pat. Nos. 3,748,682 and 3,881,211. The U.S. Pat. No. 3,748,682 is directed to a mop of polypropylene strips for cleaning up an oil spill along a shore line and has a handle firmly attached to the polypropylene strips in a rigid manner with no moving parts. The U.S. Pat. No. 3,881,211 while being directed to a dietary control mop of polypropylene is formed to a flat base strip of polypropylene having branches extending from one side of the strip, the strip being rolled in a volute curve and a handle secured thereto. In neither patent is there taught a structure for retaining the polypropylene strips and flaring them for use in a cooking vessel in one condition and a washing mode in another condition as by use of a sliding cup and in which the loop engaging means for the polypropylene defines a threaded core for the handle for kitchen use.

With the foregoing and other objects in view the invention will be more fully described hereinafter and more particularly pointed out in the appended claims.

In the drawings in which like parts are denoted by reference characters throughout the several views:

FIG. 1 is a top plan view of the dietary mop of the present invention with the slide cup in the retracted position for washing the mop.

FIG. 2 is a side elevational view of the dietary mop of FIG. 1 with the slide cup in its fully forward position causing fanning out of the polypropylene strips.

FIG. 3 is a fragmentary vertical sectional view through the mop of FIGS. 1 and 2 with the polypropylene strips removed from the loop and the slide cup retracted.

Referring now to the drawings, 10 designates a bundle of filaments of narrow thin gauge strips of polypropylene of the order of 2.0 mils thick by ⅛ inch wide which are surrounded by a loop 11 of wire (heavy gauge) which is twisted as shown in FIG. 3 to define a threaded shaft 12. Receivable over the shaft 12 is a plastic tubular casing 13 which acts as a smooth surface over which an open ended cup 14 slides. The cup 14 has a flared mouth 15 to, upon being slide along the casing 13 from the position of FIG. 1 to that to FIG. 2, cause a fanning out of the polypropylene strips for attracting oil or cooking grease from a cooking vessel.

A handle 16 has a recess 17 for receiving the free end of the threaded shaft 12 and a resilient boss 18 retains one end of the casing 13 and is force fit on the handle 16. Both the handle 16 and boss 18 are plastic to permit frictional conformation of the threaded shaft 13 for retention in the handle 16. The handle 16 has finger grasping contours 19 and a hand up opening 20.

In use, as shown in FIG. 2, the dietary mop pulls grease right off the top of hot chile or vegetable soup while cooking without waiting for the chile or soup to cool to skim off the grease. In working with gravy the mop attracts large amounts of grease from fatty gravys permitting enjoyment of the gravy flavor with minimum fat or grease.

Greasy foods such as pork chops can be lightly brushed just before serving to attract the grease to the polypropylene strips so that the flavor of the meat can be enjoyed without the high caloric intake that accompanies grease.

The mop of the present invention is easily cleaned by retracting the slide cup 14 to the position of FIG. 1 so that the polypropylene strips can be placed under a steaming hot water faucet or the mop assembly may be placed in a dishwasher.

What I claim is:
1. An oil or grease mop for dietary control when cooking foods containing oil or grease comprising:
   a. a plurality of lengths of narrow thin gauge strips of polypropylene of the order of 2.0 mils thick by ⅛ inch wide,
   b. wire means engaging the strips of polypropylene about mid-point of their lengths and being twisted to form a threaded shaft,
   c. a plastic tubular casing over the major portion of said threaded shaft,
   d. a metallic open ended cup slidable over said plastic tubular casing and having a flared mouth passable over the polypropylene strips at their mid-points to cause the strips to form a brush in a lowered position of the cup and to permit fanning out of the strips for cleaning in an upper position of said cup,
   e. handle means having a recess in one end retaining the end of the shaft of said wire engaging means and retaining said plastic tubular casing.

* * * * *